UNITED STATES PATENT OFFICE.

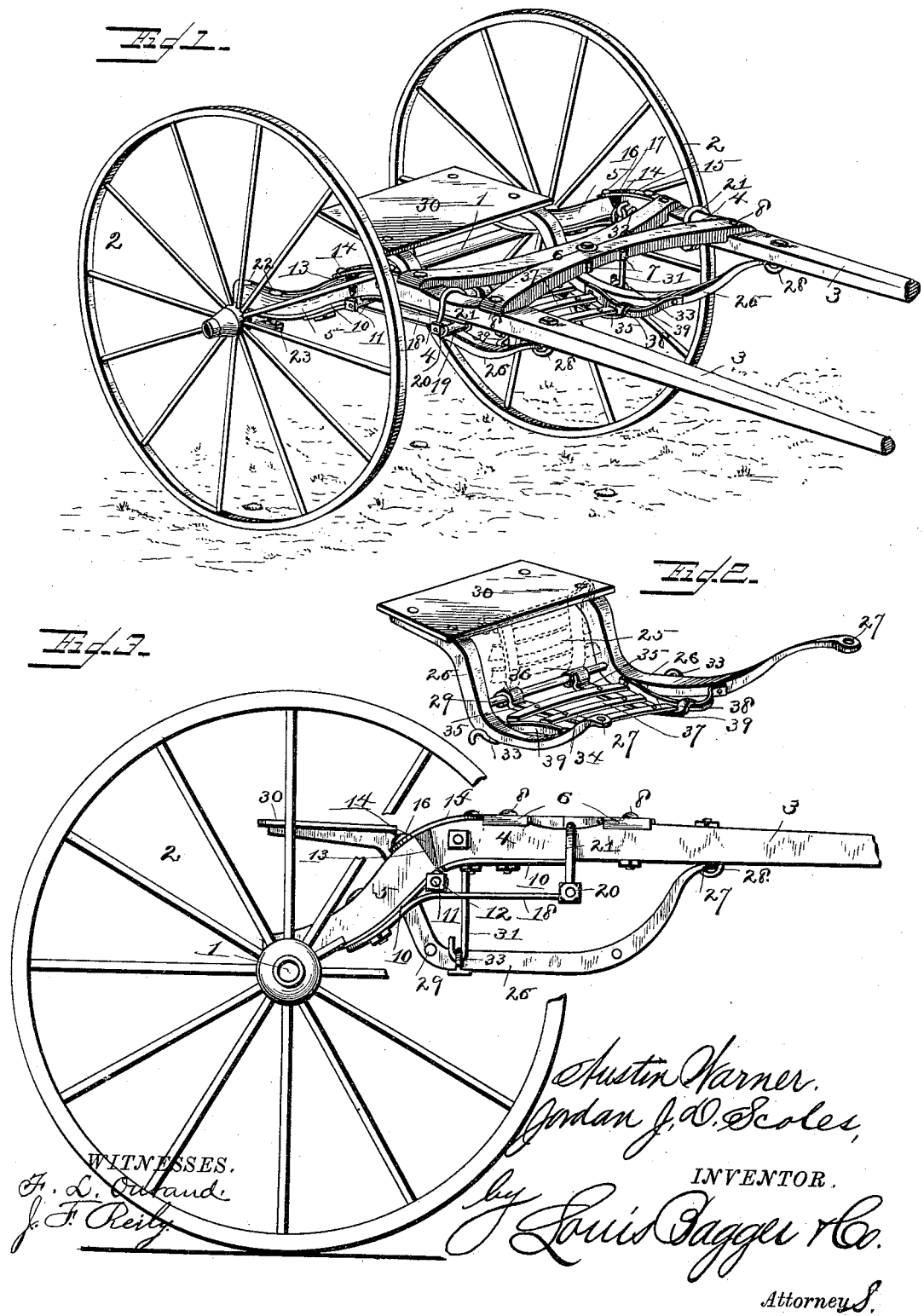

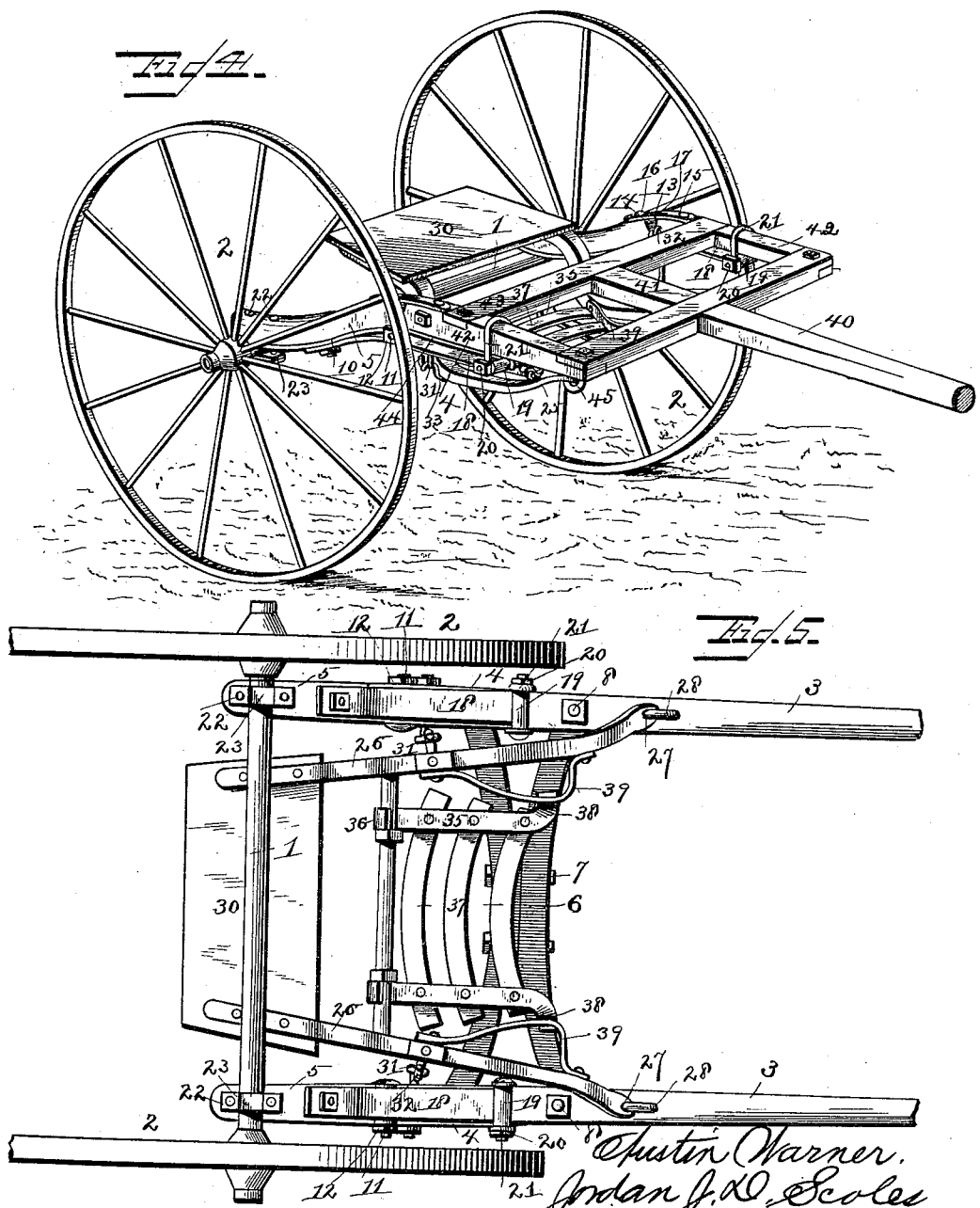

AUSTIN WARNER AND JORDAN J. D. SCOLES, OF KNOXVILLE, IOWA.

TWO-WHEELED VEHICLE.

SPECIFICATION forming part of Letters Patent No. 381,448, dated April 17, 1888.

Application filed November 19, 1887. Serial No. 255,623. (No model.)

*To all whom it may concern:*

Be it known that we, AUSTIN WARNER and JORDAN J. D. SCOLES, residents of Knoxville, in the county of Marion and State of Iowa, have invented certain new and useful Improvements in Two-Wheeled Vehicles; and we do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of a speeding or road cart constructed according to our invention. Fig. 2 is a perspective detail view of the seat-frame and the hinged foot-rest. Fig. 3 is a side view, on an enlarged scale, of the cart. Fig. 4 is a perspective view of the cart, showing the shafts removed and replaced by a tongue for two horses; and Fig. 5 is a perspective view of the cart, taken from the under side thereof.

The same numerals of reference indicate corresponding parts in all the figures.

Our invention consists in certain new and important improvements in two-wheeled vehicles, which will be hereinafter fully described and claimed.

Referring to the several parts by their designating-numerals, 1 indicates the axle, and 2 2 the wheels, of the two-wheeled vehicle shown in the accompanying drawings, in which our invention is embodied.

3 3 indicate the shafts, each shaft being cut in two transversely near its rear end, so as to form the front or main section, 4, and the short rear section, 5. The shafts proper, 4 4, are held together by the two curved cross-pieces 6 6, which meet at their centers and diverge at their ends, being bolted together at their centers, where they meet, by the bolts 7 7, and bolted securely at their ends upon the shafts by the T-head bolts 8 8. The singletree 9 is bolted at its center to the under side of these curved cross-bars at the center of the same, so as to extend under the shafts. The main and rear sections of each shaft are hinged together at the lower side of their adjacent ends by the strong hinge 10, one half of the hinge being bolted to the under side of the forward part of the rear shaft-section, while the other half of the hinge is bolted to the under side of the rear end of the main shaft-section, so that the eyed ends of the said halves will fit together and be held and hinged together by the bolt 11, having the small nut 12 on its threaded outer end. The adjacent ends of the two sections are cut away somewhat on an incline or at an angle, preferably, so as to leave between them the space 13. In this space 13, between the hinged ends of the two sections of each shaft, is placed an elastic cushion, 14, preferably of rubber, which entirely fills the said space. Upon the top of the rear end of each shaft is bolted the front end of a stop-plate, 15, which is slightly curved to conform to the curvature of that part of the shaft, and which extends over the joint and the rubber in the space 13, and is movably secured at its rear end upon the top of the forward end of the rear shaft-section by a screw-bolt, 16, which passes through a longitudinal slot, 17, in the rear end of the stop-plate and into the rear shaft-section.

To the under side of the rear section of each shaft is bolted the rear end of a spring, 18, the said spring-plate extending forward under the joint-hinge, and being formed at its forward end with an eye, 19, which is pivoted on a bolt, 20, which runs through and connects the lower eyed ends of the stirrup 21, which runs over the shaft between the diverging ends of the cross-pieces 6 on each shaft.

The rear lower ends of the rear shaft-sections are secured to the axle 1 by the bolts 22 22 and dip-plates 23, as shown, or in any other suitable manner. It will now be readily seen that in operation by jointing the shafts, as above described and shown, with the rubbers between the hinged ends of the shafts, and by further employing the bottom springs and the top check or stop plates, 15, the horse-motion will be thoroughly, entirely, and effectually taken up, and a perfectly easy motion given to the cart in use, at the same time preventing the jar that a solid shaft necessarily gives from the back of the horse, thus making a two-wheeled cart or vehicle constructed according to our invention exceedingly easy and pleasant to ride in, and at the same time making it easier on the horse.

From the foregoing description, taken in connection with the accompanying drawings, the construction, operation, and great advantages of this part of our invention will be readily understood and appreciated. It will be seen that we can construct any form or style of two-wheeled vehicle in accordance with our invention, and that the horse-motion will be effectually and completely taken up, rendering the cart or other vehicle far more pleasant and agreeable to ride in and also easier on the horse.

Where it is desired to use two horses to the vehicle, this can be readily done by withdrawing the bolts from the hinges and those which hold the rear-slotted ends of the check-plates and the front ends of the spring-plates, when the main sections of the shafts can be removed and the tongue shown in Fig. 4 substituted. The vehicle can be built with either shafts or a tongue, for one or two horses, or can be built with both, and either can be used, as required. The springs 18 18 of course operate to bring the parts back to their normal position.

25 indicates the seat-frame of my invention. This frame is formed with the side pieces, 26 26, which diverge toward their front ends, and are formed at their front ends with the apertures or holes 27 27, through which pass the staples 28 28, which hinge the front ends of the side pieces to the under side of the shafts, as shown. These side pieces, 26, are connected together at a point below and just in front of the seat itself by the cross rod or bar 29, and the side pieces are then curved up and then back, as shown, and upon their upper rear ends is bolted a suitable seat, 30. The seat-frame is supported from the shafts by the links 31 31, which are secured at their upper ends in eyebolts 32 32, which are secured in the rear ends of the front main shaft-sections, and these links engage at their lower end with hooks 33 33 on the sides of the seat-frame, as shown. The seat-frame and seat are thus supported in between the rear ends of the shafts behind the horse, so as to make the vehicle or sulky exceedingly compact.

34 indicates the foot-support, which is formed with the side hinge-bars, 35 35, which are formed at their rear ends with eyes 36, which are hinged upon the cross-rod 29 of the seat-frame, as shown, and upon which are bolted the cross-pieces 37, of wood, three of these being usually employed. The front ends of the hinge-bars 35 35 are bent out and then formed into hooks 38, which, when the foot-support is down in its lowered position, will engage with side loops, 39 39, on the inner side of the side pieces of the seat-frame, and hold the hinged foot-support in its lowered horizontal position.

When driving a horse with the usual stride, the foot-support remains down and supports the feet of the driver; but when speeding or driving a horse with a long stride the hinged foot-support is turned back up and out of the way, as shown in dotted lines in Fig. 2 of the drawings, and the driver rests his feet in the loops 39 39, which are made large enough for this purpose. The foot-support is thus removed out of the way, so that a horse with a long stride will not strike against its front edge. It will be seen that by this construction the vehicle can be built unusually compact, thus enabling us to build a much shorter cart closer up to the horse than if a stationary foot-rest were employed. The foot-support is kept down preferably, except when speeding the horse, when it can be turned up and back in a moment and the foot rested on the side loops, 39.

The tongue 40 (shown in Fig. 4 of the drawings) is formed with the rectangular frame 41 at its rear end, the rear end of the tongue being secured to the center of this frame. The short side pieces, 42 42, of this end frame extend back of the rear cross-bar, 43, of the same and have bolted to their under sides the half-hinges 44, which are precisely the same in construction as the half-hinges bolted to the rear ends of the shafts. When a cart to which this tongue is to be used is provided with the seat and seat-frame before described, the forward parts of the side pieces, 42 42, are provided with staples 45 45 similar to the staples 28 28 of the shafts which hinge the front ends of the side pieces of the seat-frame to the sides of the frame 41. These staples are secured removably in position by the nuts 46 on their upper threaded ends, as shown.

Having thus described our invention, what we claim, and desire to secure by Letters Patent of the United States, is—

1. In a two-wheeled vehicle, the combination of the shafts divided to form the short rear sections and the main front sections, the hinges, the elastic packings, the slotted check-plates, and the bolts passing through the said slots, the springs formed with eyes at their front ends, and the stirrups arranged as described, substantially as set forth.

2. In a two-wheeled vehicle, the combination, with shafts having the staples and the eyebolts arranged as described, of the seat-frame having the seat at its rear end, formed with the side pieces having the apertures at their front ends connected by the cross-rod, and formed with the outer eyes and the inner loops, and the hinged foot-support having the side bars formed at their rear ends with the eyes and bent at their front ends to form the hooks, and the supporting-links, substantially as and for the purpose set forth.

3. In a two-wheeled vehicle, a seat-frame having a hinged foot-support adapted to be turned back out of the way when required.

4. In a two-wheeled vehicle, the combination, with a seat-frame having the large inner side loops, of a foot-support hinged at its rear end and formed at its forward end with the side hooks.

5. In a two-wheeled vehicle, the combination, with a seat-frame having its side pieces connected by the cross-rod and provided with the large inner loops, of a hinged foot-support formed with the side bars, having the eyes at their rear ends and the hooks at their front ends adapted to engage with the said loops, substantially as and for the purpose shown and set forth.

In testimony that we claim the foregoing as our own we have hereunto affixed our signatures in presence of two witnesses.

AUSTIN WARNER.
JORDAN J. D. SCOLES.

Witnesses:
A. J. P. BARNES,
WM. BOYLE.